Figures 1, 2:
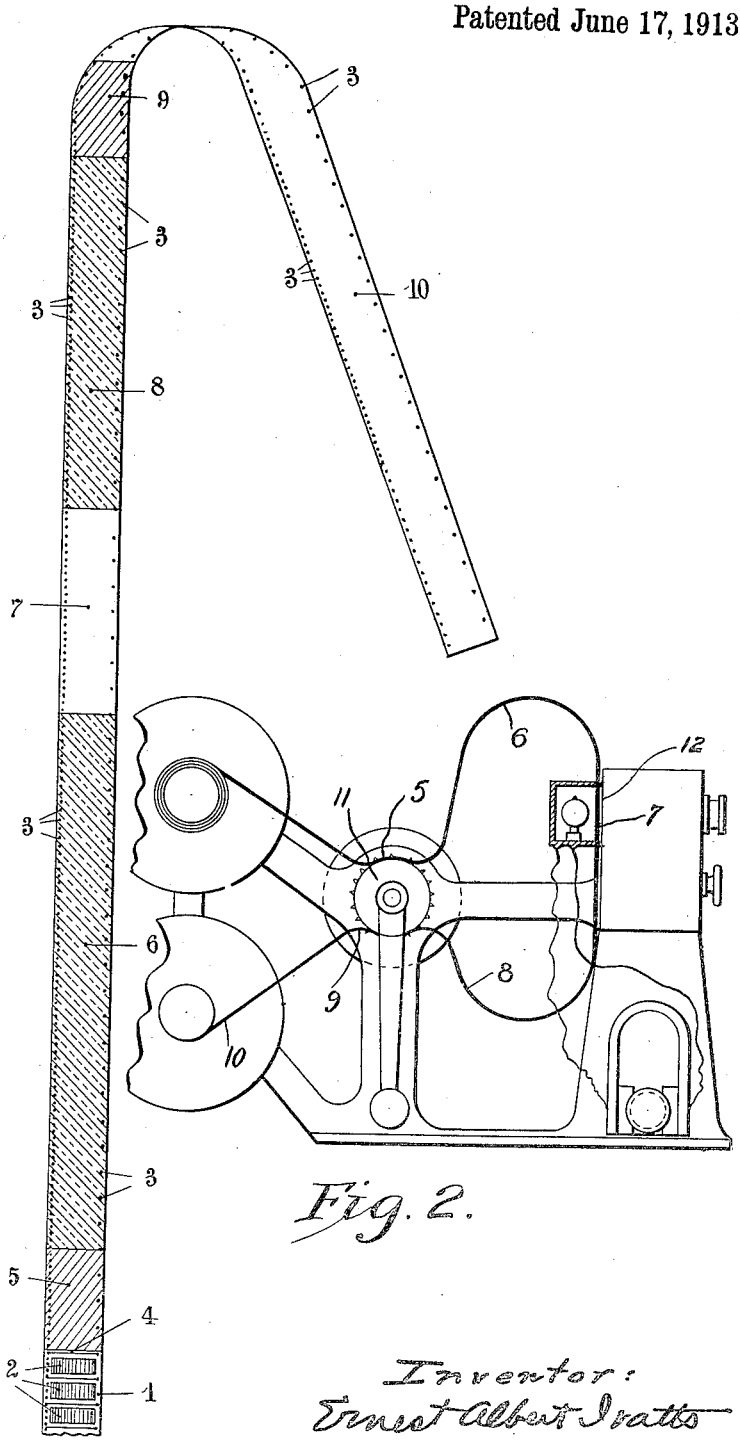

E. A. IVATTS.
INDICATING DEVICE FOR THE INSERTION OF FILMS IN KINEMATOGRAPHIC PROJECTING APPARATUS.
APPLICATION FILED SEPT. 17, 1912.

1,065,135.

Patented June 17, 1913.

Witnesses:

Inventor:
Ernest Albert Ivatts
by
Attorney

UNITED STATES PATENT OFFICE.

ERNEST ALBERT IVATTS, OF PARIS, FRANCE, ASSIGNOR TO SOCIETY: COMPAGNIE GENERALE DES ETABLISSEMENTS PATHE FRERES, PHONOGRAPHES ET CINEMATOGRAPHES, OF PARIS, FRANCE.

INDICATING DEVICE FOR THE INSERTION OF FILMS IN KINEMATOGRAPHIC PROJECTING APPARATUS.

1,065,135. Specification of Letters Patent. Patented June 17, 1913.

Application filed September 17, 1912. Serial No. 720,877.

*To all whom it may concern:*

Be it known that I, ERNEST ALBERT IVATTS, a citizen of Great Britain, residing at Paris, in the Department of the Seine and Republic of France, have invented certain new and useful Improvements in Indicating Devices for the Insertion of Films in Kinematographic Projecting Apparatus, of which the following is a specification.

The charging of kinematographic projecting apparatus, that is to say the insertion or starting of the film to be projected is a rather difficult operation, demanding a certain amount of skill and experience before being able directly to insert the film in its proper position so as to obtain a correct projection from the start.

If it is easy for an experienced operator to start a film correctly, for example by directly obtaining at each loop before and after the feeding device, the exact length necessary, it will not, however, be the case for an inexperienced operator and the result will be that the film will not be inserted correctly and consequently will unmesh during the course of projection, so that the film will have to be removed from the apparatus and started again. It will be easily understood that this will tend to dishearten amateurs who desire to make kinematographic projections for their pleasure and that a certain amount of blame will be attributed to the apparatus, however perfect they may be.

This invention is for the purpose of avoiding this disadvantage and consists of colored indicating sections on the film adapted to correlate to the drum and film trap of the kinematographic projecting apparatus, more particularly apparatus for amateurs, in such manner that the starting of the film is effected correctly without any trial by any person experienced or not. This indicating device is connected up to the commencement of the film to be projected instead of the ordinary starting-piece which consists as is well-known of a certain length of support, emulsified or not, but not printed, although the same result can be obtained by utilizing the said starting-piece for the indicating device. This indicating device, whether it is substituted for the starting-piece or whether the said starting-piece is utilized for this purpose, essentially consists of a band of suitable length of the same width and driven in the same manner as the film to be projected. This band of any suitable material but preferably of the same kind as the support of the film is connected to the commencement of the film by the usual means and comprises a certain number of colored indications, which may vary according to circumstances, and indicate to the inexperienced operator that certain portions of the band carrying certain indications should be situated on such and such parts of the apparatus. By observing these indications the film can be correctly inserted, indeed almost automatically, resulting in a perfect projection from the very beginning and not interrupted for example by the breaking of the film owing to the absence of the necessary loop for the correct unwinding of the film.

Figure 1 is a view of a part of a film provided with my indicating device; and Fig. 2, a diagrammatic side view of a projecting apparatus on which the film of Fig. 1 is adapted for use.

For the sake of example one application of the invention is shown in Fig. 1 of the accompanying drawing showing the commencement of a film provided with perforations and to which is connected an indicating device in which the indications are formed by variously colored sections and in accordance with a certain order that can be rapidly recognized by the operator with the assistance if necessary of an identically colored diagram indicating the respective position of each colored section on the parts of the apparatus.

Referring to Fig. 1, 1 is the support of the film comprising the picture 2, the first of which consists of the title of the piece, and perforations 3 obtained by any suitable method, for example by the mixed method. 4 is the connecting spot formed by beveling and pasting the film to the perforated indicator in accordance with the same method, this connecting spot of course will not exist when the ordinary starting-piece of the film is employed for forming the indicator. The indicator is formed by the various colored sections 5, 6, 7, 8 and 9. The sections 5 and 9 for example being colored in blue, 6 and 8 in red and 7 in white, or if desired need not be colored, this portion of the indicator preserving its natural transparency.

Other distinctive marking might be used within the principles of this invention.

It being supposed according to the type of apparatus, for example the amateur apparatus shown in Fig. 2 which is described in the pending applications filed in the United States on the 4th January 1910, Serial No. 536,281 and 29th January 1912, Serial No. 674,109 in the name of the same inventor, the operator knows by means of a colored diagram or otherwise that for example the blue section 5 of the indicator should be placed on the upper portion of the feeding device 11 of the apparatus, the section 6 should form the loop between the feeding device and the sliding passage or film trap 12 of the apparatus, which sliding passage should receive the white or uncolored section 7 and the red section 8 should rest on the said sliding passage and the feeding device, on the lower portion of which should be adapted the blue section 9, a starting piece 10 passing from this feeding device to the winding reel. Under these conditions it is evident that there cannot be any error and that the charging of the film will be effected correctly.

Having now particularly described and ascertained the nature of my invention, and in what manner the same is to be performed, I declare that what I claim is:

In a kinematographic apparatus having means for the generation of its own electric light, the combination with a film operating drum, and a film trap, of a film provided with differently colored sections which are respectively adapted to indicate the parts of the film which engage the drum, the film trap, and form the loops, when the film is threaded into the kinematographic apparatus.

In testimony whereof I affix my signature in presence of two witnesses.

ERNEST ALBERT IVATTS.

Witnesses:
CAIUS DANZER,
LUCIEN CRESPIN.